United States Patent [19]

Weinhold

[11] 3,771,818
[45] Nov. 13, 1973

[54] APPARATUS FOR THE ATTACHMENT OF A HOSE OR A COUPLE TO A PIPE END

[76] Inventor: Karl Weinhold, Im Jagdfeld 43, 4040 Neuss, Germany

[22] Filed: Oct. 12, 1971

[21] Appl. No.: 188,298

[30] Foreign Application Priority Data
Oct. 22, 1970 Germany.................. P 20 51 987.3

[52] U.S. Cl................................ 285/242, 285/420
[51] Int. Cl............................................ F16l 33/22
[58] Field of Search................... 285/242, 241, 252, 285/409, 408, 410, 420

[56] References Cited
UNITED STATES PATENTS
2,725,246    11/1955    Weinhold........................... 285/252

FOREIGN PATENTS OR APPLICATIONS
45,511    2/1966    Germany............................ 285/252
770,981    3/1957    Great Britain...................... 285/252
897,027    11/1953    Germany Primary Examiner—Jordan Franklin
Assistant Examiner—Wayne L. Shedd
Attorney—Krafft and Wells

[57] ABSTRACT

In an apparatus for attaching a hose or a rigid pipe connection to a pipe end by using two rigid half shells surrounding the pipe end, the half shells comprising interlocking hinged arms disposed radially with respect to the axle of the hinge and a radial mounting support carrying the pipe end, the support engaged between the hinged arms, the improvement comprising: two hinged arms of one half shell each arm exhibiting a link pin extending in the direction of the axis of the hinge and two hinged arms of the other half shell each arm exhibiting an indentation receiving said link pin, the smallest distance between the hinged arms exhibiting the indentation being at least as large as the largest axial dimension of the hinged arms exhibiting the link pins and the mounting support being disposed in the space provided between the hinged arms when the link pins have been inserted in the indentation.

9 Claims, 6 Drawing Figures

PATENTED NOV 13 1973　　3,771,818

APPARATUS FOR THE ATTACHMENT OF A HOSE OR A COUPLE TO A PIPE END

This invention relates to a device for attaching a hose or a rigid pipe connection to a pipe end by using two rigid half shells to surround the pipe end. The half shells are joined to each other in an articulated manner at one of their ends at an axis which is parallel to the axis of the pipe end. The half shells have interlocking hinged arms extending radially to this axial of articulation, a radial mounting support carries the pipe end and is engaged between the hinged arms, and a fastener connects the opposed ends of the half shells.

In the prior art devices of this type, the hinged attachment of the two rigid half shells is effected in the zone of their hinged arms with the aid of an articulated axle extended through bores provided in the hinged arms. In this arrangement, the axle of the hinge also passes through the radial mounting, so that the latter is likewise held with the aid of the axle of the hinge. In order to attain a uniform load distribution in the closed condition of the device, it is necessacry to provide, on one half shell, two pairs of hinged arms so that respectively one hinged arm of the other half shell can engage in the space between the two hinged arms of one of the hinged arm pairs. The mounting proper is inserted in the space present between the two pairs of hinged arms. During the mounting precedure, the axle of the hinge must be extended through several bores which must be brought into identical alignment. Subsquently, it is necessary to fix the axle of the hinge in the axial direction, and this is effected in most cases by riveting.

This mode of construction has the disadvantage of a relatively expensive manufacture and assembly in the zone of the hinged connection. The attachement of the two half shells and of the mounting require a long assembly period, for the two half shells and the mounting must simultaneously be held in that position with respect to one another which is the only one wherein the axle of the hinge can be passed through the components. An additional complication arises due to the subsequent riveting step, necessary for the axial fixing of the axle of the hinge.

Starting with this consideration, the invention is based on the problem of constructing a device for the attachement of a hose or of a rigid pipe connection to a pipe end in such a manner that the manufacture and assembly can be essentially simplified and in particular, the number of working steps required is to be reduced.

In order to solve this problem, according to the invention, in a device of this type mentioned in the foregoing with two rigid half shells surrounding the pipe end, the half shells comprising interlocking hinged arms disposed radially with respect to the axle of the hinge and a radial mounting support carrying the pipe end, the support engaged between the hinged arms, providing that two hinged arms of one half shell respectively exhibit a link pin extending in the direction of the axis of the hinge and two hinged arms of the other half shell respectively exhibit an indentation receiving a link pin; that the smallest distance between the hinged arms exhibiting the indentation is at least as large as the largest axial dimension of the hinged arms exhibiting the link pins; and that the mounting support is disposed in the space provided between the hinged arms when the link pins have been inserted in the indentation.

In the device constructed according to the present invention, the half shells need to have only two hinged arms, respectively, wherein the hinged arms of one half shell are provided with the link pins during their manufacture. Of course, this also applies analogously in the manufacture of the half shells exhibiting the indentations, for example in the case where the half shells are cast. In order to assemble the hinged couple, it is merely necessary to bring the hinged arms of one half shell, provided with the link pins, into alignment with the identations in the hinged arms of the other half shell, and both half shells are then shifted to a slight extent in such an axial direction with respect to each other that the link pins engage the indentations. In using this procedure, a space for the introduction of the mounting support carrying the pipe end is made available between the respectively inner hinged arms of the two half shells. As soon as the mounting support has been inserted in this space, the two half shells cannot be displaced in the axial direction so that the link pins can not leave the indentations. Thus, the mounting support serves as a wedge blocking the axial displaceability between the hinged shells, and it is unnecessary to take additional steps for this purpose. Accordingly, the manufacture and assembly of a device constructed along the lines of the present invention are substantially simplified, since several hinged arms are omitted, an axle for the hinge, which represents a special structural element, is no longer required, and the assembly of the arrangement proper requires substantially less skill and time. Since the continuous axle for the hinge is eliminated, the mounting support need not be provided with a corresponding recess or bore.

Several advantageous embodiments of the invention are described hereinbelow.

It is advantageous to provide the link pins with a circular cross section, while the indentations can be fashioned as bores extending through the hinged arms.

In another embodiment, the link pins and the indentations exhibit a circular cross section only in their surface zones which engage each other during the transition from the opened condition into the closed condition of the device, whereas they have any desired shape in the other surface zones; for example, they can be flattened.

It is not absolutely necessary to fix the mounting support carrying the pipe end in the radial direction. The functioning of the device is ensured even without such a radial fixation, for, in the closed condition, the half shells prevent the migration of the mounting support out of its place between the hinged arms, especially when the device is designed for hoses or connecting pieces having a relatively minor wall thickness. Whereas, basically, any desired locking means can be employed for the device as constructed according to this invention, the conventional toggle lever locks are employed particularly advantageously. These toggle lever locks each exhibit a spring clip attached with one of its ends to the toggle lever and with its other end to that half shell which is opposed to the half shell carrying the toggle lever. There are two basically different possibilities for attaching the spring clip of the half shell, namely a releasable and a non-releasable attachment. In order to realize the latter, it is necessary to provide the half shell also on this side with two hinged arms, and to bend the end of the spring clip likewise in the form of an eye, so that it is possible to pass the axle for the hinge, such as, for example, a rivet, therethrough. This mode of construction exhibits the disadvantage that it is considerably complicated mechanically. On the other hand, to provide a releasable attachment, it is known to bend the end of the spring clip merely in the manner of a hook and to allow this hook to engage an opening provided in the half shell before the toggle lever is brought into its closing position. Although this embodiment is less complicated, it has the disadvantage, in a device manufactured according to the present invention, that the half shells can open wide to an arbitrary extent, and a mounting support which is not arrested in the radial direction can leave the space between the half shells, together with the pipe end. Then, the mounting support is no longer capable of preventing the mutual axial shifting of the half shells, and of preventing a release of the hinge connecting the half shells. In the opened condition, the device would then fall apart into three components.

In a further development of this invention, in order to avoid, the additional provision of a hinged mounting for the spring clip, the otherwise suitable toggle lever lock is used on the one hand, and yet to avoid, on the other hand, the undesirable detachment of the spring clip from the half shell and thus a falling apart of the device, the spring clip is provided, on its end attached to the respective half shell, with a bend imparting a radial directional component to the extension of the clip, and two stops are disposed one behind the other in the circumferential direction between which the spring clip is passed in the bend and the stops engaging respectively one side of the spring clip.

The object is thereby achieved that the spring clip, in the zone of its bend, absorbs the forces effective in the circumferential direction during the closing of the toggle lever lock, although this clip is passed between the stop without additional fastening means. The spring clip, fixedly attached to the toggle lever proper, cannot detach itself from the half shell even on this side.

Consequently, the object is achieved that, even in the opened condition of the device, the mounting support and the pipe end cannot leave the space between the half shells, so that the device proper cannot fall apart even without an additional radial fixation of the mounting support. The very low cost from a commercial point of view is of particular advantage in this connection.

Thus, when the mounting support is guided freely between the hinged arms in the radial direction, the support should be long enough in this direction that it remains guided between the hinged arms even when the pipe end, when the device is opened, has been displaced up to the toggle lever lock.

However, on the other hand, no great mechanical complexity is involved, either, when it is desired to fix the mounting support and the pipe end in position in the radial direction. In case, for example, the indentations are fashioned as bores passing through the hinged arms, it is possible, according to a further embodiment of the present invention, to provide the mounting support, on its side facing the bore of a neighboring hinged arm, with a projection which engages the bore, when the mounting support is introduced between the hinged arms, and limits the radial displaceability of the mounting support. In order to provide the engagement of this projection, a minor elastic deformation of the material is sufficient, as it is possible even in case of cast components. However, this design is particularly advantageous when the device, or only parts thereof such as, for example, the mounting support, consist of plastic.

The projection need not be provided directly during the manufacture of the mounting support; rather, this projection can also comprise a ball inserted in a bore or a radial slot of the mounting support.

Embodiments of the present invention are described in greater detail below with reference to the drawing.

In the figures.

Figure 1:
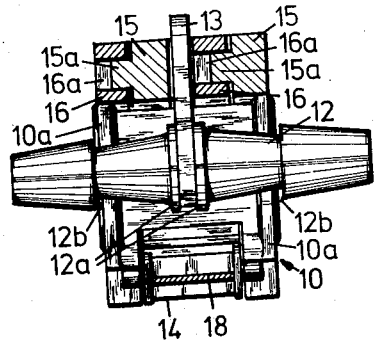
FIG. 1 is a section through a first embodiment of the device, with the toggle lever lock closed.

In the embodiment shown in FIGS. 1–4, the device consists of two half shells 10 and 11, a mounting support 13 carrying a pipe end 12, and a toggle lever lock 14. In the illustration of FIG. 1, only the half shell 10 is seen, provided with two hinged arms 15. The latter each have a link pin 15a extending in the axial direction. The opposed half shell 11 exhibits two hinged arms 16 wherein the identations serving for receiving the link pins 15a are designed as bores 16a.

The mounting support 13 consists of a piece of flat material encompassing the pipe end 12 between two annular extensions 12a, thus retaining the pipe end. The pipe end 12 has conical peripheral surfaces and radial clamping surfaces 12b representing a constriction in cross section. These clamping surfaces have a specific axial alignment with respect to clamping edges 10a and 11a provided at the half shells 10 and 11, in order to provide a satisfactory press fit of the two hose ends 17.

The toggle lever lock consists of a toggle lever 18 and a spring clip 19. The toggle lever 18 is foldably mounted to one end of the half shell 11 with the aid of a rivet 20, whereas the spring clip 19 is hingedly attached to the toggle lever 18 via a rivet 21. On its free end, the spring clip 19 is bent at approximately a right angle, so that it also exhibits a directional component which extends radially inwardly. The last section of the free end is, in turn, slightly angled in the opposite direction, i.e. in the direction toward the circumference. Accordingly, the spring clip 19 can be placed around a stop 22 so that the inner side of the spring clip 19 contacts this stop 22. The last end of the spring clip 19, bent in the opposite direction, engages under a further stop 23 so that the outside of the spring clip 19 contacts this stop. The stop 23, just as the stop 22, is a component of the half shell 10, and both stops form between them an opening for passing the spring clip 19 therethrough.

The assembly of the device is effected as follows: First of all, the two half shells 10 and 11 are held together in the zone of their hinged arms 15 and 16 in such a manner that the link pins 15a of the hinged arms 15 are disposed in front of the bores 16a of the hinged arms 16. Then, the link pins 15a can be introduced into the bores 16a. During this step, an interspace is vacated between the inner hinged arm 15 of the half shell 10 and the inner hinged arm 16 of the half shell 11, the axial dimension of this interspace corresponding approximately to the length of the link pin 15a. At the time when the spring clip 19 has not yet been attached to the half shell 10 and the half shells 10 and 11 can be opened as wide as desired, the mounting support 13 with the pipe end 12 is inserted in this vacated space. The toggle lever 18 proper can have been attached to the half shell 11 prior to this step. In this case, it is then only necessary to introduce the spring clip 19, under slight bending of the angled free end, into the space provided between the stops 22 and 23. Due to the triangular cross section selected for the stop 22, and due to the position of this stop, it is ensured that the spring clip 19 is attached flush and reliably at the half shell 10, so that the clip cannot detach itself when the lever lock is opened. The mounting support 13 is of such a length that it is securely guided between the inner hinged arms 15 and 16 of the half shells 10 and 11, respectively, even when it has been displaced, during the time the hose end 17 is withdrawn, up to the toggle lever 18 or to the spring clip 19.

For this reason, no additional measures are required for a radial fixation of the mounting support 13.

Figure 5:
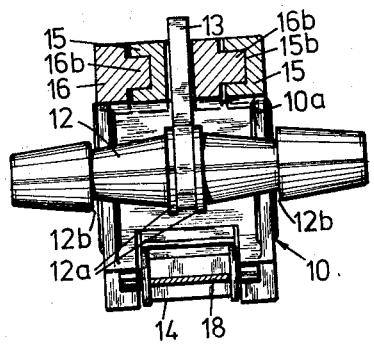
FIG. 5 shows a sectional view of a second embodiment of the device, analogous to the representation of FIG. 1.
Figure 2:
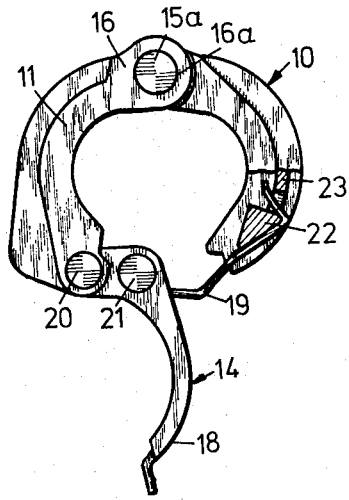
FIG. 2 is a lateral view of the device of FIG. 1 with the toggle lever lock opened, partially in section.

In the embodiment of FIG. 5, corresponding elements are provided with identical reference numerals. The hinged arms 15, however, exhibit blind bores 15b in this embodiment, in place of the link pins 15a, whereas the hinged arms 16 are now provided with link pins 16b. It is, of course, basically arbitrary whether indentations or bores are provided in the hinged arms 15 or 16, respectively. The only important point is that they extend, just as the link pins, in the same axial direction. In the embodiment of FIG. 5, the hinged arms 15 thus do not exhibit continuous bores, but only blind holes 15b, the depth of which corresponds to the length of the link pins 16b.

Figure 6:
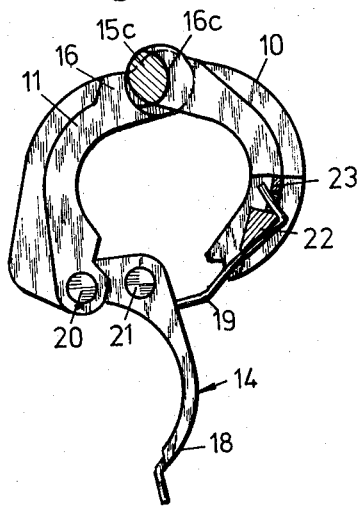
FIG. 6 is a representation of a further embodiment of the device analogous to the lateral view of FIG. 2.
Figure 3:
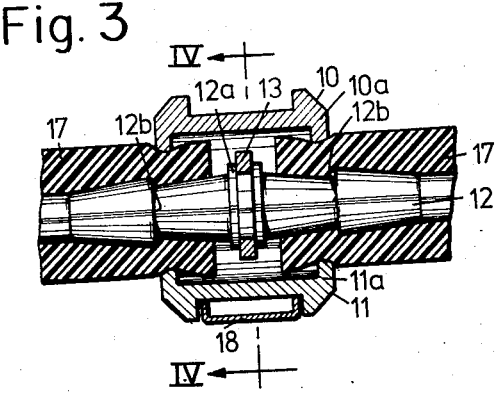
FIG. 3 shows a sectional view rotated by 90° with respect to the section of FIG. 1, showing the device with a hose clamped to it.
Figure 4:
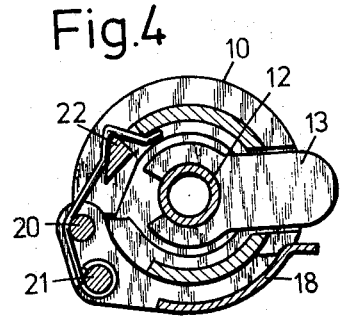
FIG. 4 is a section along line IV—IV of FIG. 3.

Also in the embodiment according to FIG. 6, corresponding parts bear the same reference numerals. However, in this case, the hinged arms 15 carry link pins 15c having an approximately semicircular cross section, so that a half-round contact surface is provided. In a corresponding manner, the hinged arm 16 has a semicircular recess 16c forming a contact surface, corresponding to the bearing surface of the link pin 15c, of a semicircular configuration.

The assembly of the device in the two embodiments according to FIGS. 5 and 6 takes place in the same manner as the assembly of the device according to the embodiment of FIGS. 1–4.

If it is intended to employ the device of this invention for the coupling of two connection pipes, a pipe end of a cylindrical outer surface is provided, not shown, in place of the pipe end 12. On this pipe end, a pipe connection can in each case be attached, the internal diameter of which corresponds to the outer diameter of the pipe end, and which is provided at its end face with an annular collar. The collar of each pipe connection is then in engagement with the clamping edges 10a and 11a of the half shells 10 and 11, which edges extend behind the collars, so that the pipe connections are held in the axial direction. In order to provide a seal between the pipe connection and the pipe end of a cylindrical outer wall, it is possible, for example, to embed an annular gasket into this outer wall in each instance.

I claim:

1. In an apparatus for the attachment of a hose or of a rigid pipe connection to a pipe end having an axis comprising first and second rigid half shells surrounding said pipe end, said half shells jointed to each other in an articulated manner at one of their ends at an axis which is parallel to said axis of the pipe end, each of said half shells having interlocking hinged arms extending radially to said axis of articulation, a radial mounting support carrying said pipe end and engaged between the hinged arms, and a lock connecting opposed ends of said half shells, the improvement comprising: hinged arms (15) of said first half shell (10) each having one link pin (15a) extending in the direction of said axis of articulation, and said hinged arms (16) of said second half shell (11) each having one indentation (16a) receiving one of said link pins (15a); the smallest distance between said hinged arms (16) of said second half shell provided with said indentations (16a) being at least as large as the largest axial dimension of said hinged arm (15) of said first half shell; and said mounting support (13) located in the space vacated between said hinged arms (15, 16) when said link pins (15a) are introduced into said indentations (16a).

2. The apparatus according to claim 1, wherein said link pins (15a) have a circular cross section.

3. The apparatus according to claim 2, wherein said indentations are bores (16a) extending through said hinged arms (16) of said second half shell.

4. The apparatus according to claim 1, wherein said link pins (15a) and said indentations (16c) have a round cross section only in their surface zones which are in contact with each other during the transition from the opened condition into the closed condition of the device.

5. The apparatus according to claim 1, wherein said lock is a conventional toggle lever lock with a spring clip (19) engaging one of said half shells (10), said spring clip (19) having the end attached to said half shell (10), a bend imparting a radial directional component to the extension of the clip; and said spring clip (19) is passed, in the zone of said bend, between two stops (22, 23) disposed one behind the other in the circumferential direction and each engaging a side of the spring clip.

6. The apparatus according to claim 5, wherein said mounting support (13) is guided, in the radial direction, freely between said hinged arms (15, 16).

7. The apparatus according to claim 6, wherein said mounting support (13) has a given length in the radial direction whereby it remains guided between the hinged arms (15, 16) when the pipe end (12), with the apparatus opened, has shifted up to the toggle lever lock.

8. The apparatus according to claim 1, wherein said mounting support (13) has on its side facing said bore (16a) of an adjacent hinged arm (16), a projection which, during the introduction of said mounting support (13), engages between the hinged arms (15, 16) into the bore (16a) and limits the radial displaceability of said mounting support (13).

9. The apparatus according to claim 8, wherein said projection is a ball inserted in a bore or in a radial slot of said mounting support (13).

* * * * *